(12) United States Patent
Acquaviva et al.

(10) Patent No.: US 6,215,552 B1
(45) Date of Patent: Apr. 10, 2001

(54) ELECTROSTATIC PROCESS CONTROL BASED UPON BOTH THE ROUGHNESS AND THE THICKNESS OF A SUBSTRATE

(75) Inventors: Thomas Acquaviva, Penfield; Paul W. Morehouse, Jr., Webster, both of NY (US)

(73) Assignee: Xerox Corporation, Stamford, CT (US)

(*) Notice: Subject to any disclaimer, the term of this patent is extended or adjusted under 35 U.S.C. 154(b) by 1034 days.

(21) Appl. No.: 08/520,228

(22) Filed: Aug. 28, 1995

Related U.S. Application Data

(63) Continuation of application No. 08/276,587, filed on Jul. 18, 1994, now abandoned.

(51) Int. Cl.[7] .................................................. G01B 11/30
(52) U.S. Cl. ............................................................ 356/371
(58) Field of Search .................................... 250/561, 571, 250/859.16, 859.22, 859.27; 356/381–382, 446, 429

(56) References Cited

U.S. PATENT DOCUMENTS

| | | | |
|---|---|---|---|
| 2,312,310 | * 3/1943 | Bradner et al. | 250/561 |
| 3,971,956 | * 7/1976 | Jakeman et al. | 250/571 |
| 4,553,033 | 11/1985 | Hubble, III et al. | 356/445 |
| 4,937,460 | 6/1990 | Duncan et al. | 250/561 |
| 4,950,905 | 8/1990 | Butler et al. | 356/446 |
| 4,989,985 | 2/1991 | Hubble, III et al. | 356/445 |
| 5,047,652 | * 9/1991 | Lishyansky et al. | 250/571 |
| 5,053,822 | 10/1991 | Butler | 355/246 |
| 5,138,178 | 8/1992 | Wong et al. | 250/559 |
| 5,139,339 | * 8/1992 | Courtney et al. | 250/561 |
| 5,146,097 | * 9/1992 | Fujiwara et al. | 354/446 |
| 5,243,407 | * 9/1993 | King et al. | 250/571 |

FOREIGN PATENT DOCUMENTS

05229219 * 9/1993 (JP).

* cited by examiner

Primary Examiner—Frank G. Font
Assistant Examiner—Michael P. Stafira
(74) Attorney, Agent, or Firm—John M. Kelly

(57) ABSTRACT

A method and apparatus for determining the properties of roughness and thickness of a substrate to be processed through a machine, and correspondingly adjusting those machine parameters that are affected and which can be optimized based on varying levels of these substrate properties.

10 Claims, 3 Drawing Sheets

ELECTROSTATIC PROCESS CONTROL BASED UPON BOTH THE ROUGHNESS AND THE THICKNESS OF A SUBSTRATE

This is a continuation, of application Ser. No. 08/276,587, filed Jul. 18, 1994, now abondoned.

FIELD OF THE INVENTION

This invention relates to optimizing copy quality and machine operating parameters in substrate marking technologies by determining the levels of substrate roughness and thickness and correspondingly adjusting substrate processing operations therewith

BACKGROUND OF THE INVENTION

Copy quality is sensitive to the properties of the copy sheet, such as the roughness and thickness level of the sheet, in marking technologies such as electrostatographic reproduction of images, e.g. electrophotography, and laser printing, as well as thermal ink jet, and thermal transfer reproduction of images. Distinct variations exist as to the levels of roughness and thickness found in individual copy sheets, such as paper, (hereinafter referred to as "substrates") that are used in a substrate marking machine. Various machine parameters are affected by the levels of roughness and thickness of a particular substrate to be processed through the machine. These machine parameters can be adjusted according to varying substrate properties, so as to optimize their functionality within the machine, as well as to achieve optimum output copy quality.

For example, an ideal goal in electrophotography is to have the correct amount of toner deposited onto a copy sheet on a continuous basis. With poor development control two situations occur. First, concerning a variability of toner quantity applied, too little toner creates lighter images, where too much toner creates darker images and may cause toner to appear in non-image areas. Second, concerning the machine, too much toner development causes excess toner waste which both increases the expense of running the machine and wears machine components at a faster pace. Replacement or repair of these components is thereby required on a more frequent basis. The need for precise toner control is intensified in color development systems where individual color images are superimposed on each other to create the full color image.

A rougher substrate contains a greater surface area than a smoother substrate, and may therefore require application of a higher developed toner mass per unit area to get the same dark, uniform, sharp copy quality. Additionally, if a greater amount of toner is required on a rougher substrate, the developer voltage must be increased, as well as the fuser set temperature, and/or the fuser dwell time to assure that the toner is completely fused to the sheet. A substrate having a greater basis weight or thickness (the terms hereinafter to be used interchangeably, based on their linear relationship with each other) escalates the need for higher fuser settings in order for the toner to be sufficiently fused to the substrate. Under-fused toner on a substrate creates the possibility of smears, streaks or blurred copies. An increased voltage may also be required for the corona generating devices associated with both the charging element, as well as the transfer element, for a rougher and/or thicker substrate.

Uniformly increasing machine parameters such as the fuser set temperature, fuser dwell time, or voltage level to the charging device, transfer device or developer may eliminate certain copy quality problems on rougher and thicker substrates, however, other negative factors are thereby created. For example, increased wear on these affected components causes the need for more frequent component repair or replacement. Furthermore, the increased power required to run the component at these higher settings results in increased energy consumption and cost. Machines that can optimize copy quality as well as internal processing operations will, of course, have a tremendous competitive edge.

It is known in the electrical graphic arts to use light sensors for measuring and consequently monitoring the density of a powderous or liquid substance. One such sensor is a developability sensor, also known as a densitometer, used to monitor the "Developed Toner Mass Per Unit of Area," referred to as DMA. A densitometer acts, generally, when toner is illuminated with a collimated beam of light from an infrared light emitting diode (LED), to measure the level of specularly reflected light therefrom. In the case of DMA measurement, toner development onto a substrate correspondingly increasingly attenuates the intensity of the light specularly reflected. The attenuation is the result of either absorption of the incident light in the case of black toners, or by scattering of the incident light away from the specular reflection angle, as in the case of colored toners. Thus, at a high DMA quantity, there is only a very small specular signal, and at a low DMA quantity, there is a higher specular light signal. Examples of densitometers are described in, for example, U.S. Pat. No. 5,053,822, 4,553,033, 4,950,905, and 4,989,985, and are hereby incorporated herein by reference.

Densitometers monitor DMA quantity on a sheet, however, they do not take into account those other machine components and parameters which can be adjusted based on varying roughness and thickness levels of a substrate, in order to optimize their functionality within the machine as well as to achieve optimum output copy quality. Furthermore, the densitometer requires one or more sheets to have run through the system before the DMA quantity on the sheet can be detected and then adjusted. Thus, toner density cannot be monitored continuously on an individual sheet basis.

Sensors for determining sheet basis weight and sheet thickness are also known. U.S. Pat. No. 5,138,178 to Wong et al. describes a non-contact sensor for sensing sheet basis weight, the relevant portions of which are hereby incorporated herein by reference. Wong et al. describes a sensor to determine the sheet basis weight by emitting electromagnetic energy or light from a source of energy, such as an LED, and sensing the amount of energy transmitted through the paper. The amount of energy transmitted through the paper is proportional to the basis weight of the paper, which is directly proportional to its thickness, assuming compositional similarity. U.S. Pat. No. 4,937,460 describes another method for determining the thickness of a sheet, which relies on the contact of the sheet by a receiver or similar element to provide a variable analog signal indicative of paper thickness. These references do not, however, take into account the roughness of the substrate, and are therefore incapable of accommodating adjustments to machine components and parameters that may be necessary for optimum copy quality and machine performance based on varying levels of roughness of individual substrates that pass through the machine. For example, thin sheets that have a high roughness level may require different machine operation settings than, for example, a thin sheet with a very smooth surface; and a thicker sheet having a very rough surface may require different settings than a thicker sheet with a smooth surface.

In response to these problems, a need exists to determine the properties of roughness and thickness of a substrate to be processed through a marking machine, and then correspondingly adjusting the machine parameters that are affected by the varying levels of these substrate properties.

As a result, the present invention provides a solution to the described problems and other problems, and also offers other advantages over the prior art.

SUMMARY OF THE INVENTION

In accordance with the invention and in accordance with one aspect of the invention, there is provided an apparatus for detecting the level of roughness and thickness in a substrate. The apparatus comprises a substrate roughness detector for determining a level of roughness of the substrate and generating a signal in response therefrom, and a substrate thickness detector for determining a level of thickness of the substrate and generating a signal in response therefrom. A controller, responsive to the signal from said roughness detector and said thickness detector, controls one or more substrate processing operations which can be optimized based on varying levels of roughness and thickness of a substrate.

In accordance with another aspect of the invention, there is provided a substrate marking machine capable of detecting the level of roughness and thickness of a substrate. The machine comprises a substrate roughness detector for determining a level of roughness of the substrate and generating a signal in response therefrom, and a substrate thickness detector for determining a level of thickness of the substrate and generating a signal in response therefrom. A controller, responsive to the signal from said roughness detector and said thickness detector, controls one or more substrate processing operations which can be optimized based on varying levels of roughness and thickness of the substrate.

In accordance with another aspect of the invention, there is provided a method for controlling machine operations based on the level of roughness and thickness of a substrate. The method for controlling machine operations based on the level of roughness and thickness of a substrate comprises the steps of determining a level of roughness of the substrate, generating a roughness signal in response to the determined level of roughness, determining a level of thickness of the substrate, generating a thickness signal in response to the determined level of thickness, and controlling, in response to the roughness signal and thickness signal, one or more substrate processing operations.

DETAILED DESCRIPTION OF THE DRAWINGS

The substrate properties determination system of the present invention can be utilized in a variety of types of equipment which perform marking operations on conventional paper or other sheets ("substrates") which vary in degrees of levels of both roughness and thickness. For example, it is understood by one skilled in the art that thermal transfer marking used in facsimile transmission of images, thermal ink jet, and laser are a few of the applications that find utility in the present invention. For purposes of illustration only, the invention is described in the context of electrophotographic printing or reproduction equipment for forming images on paper.

Figure 1:
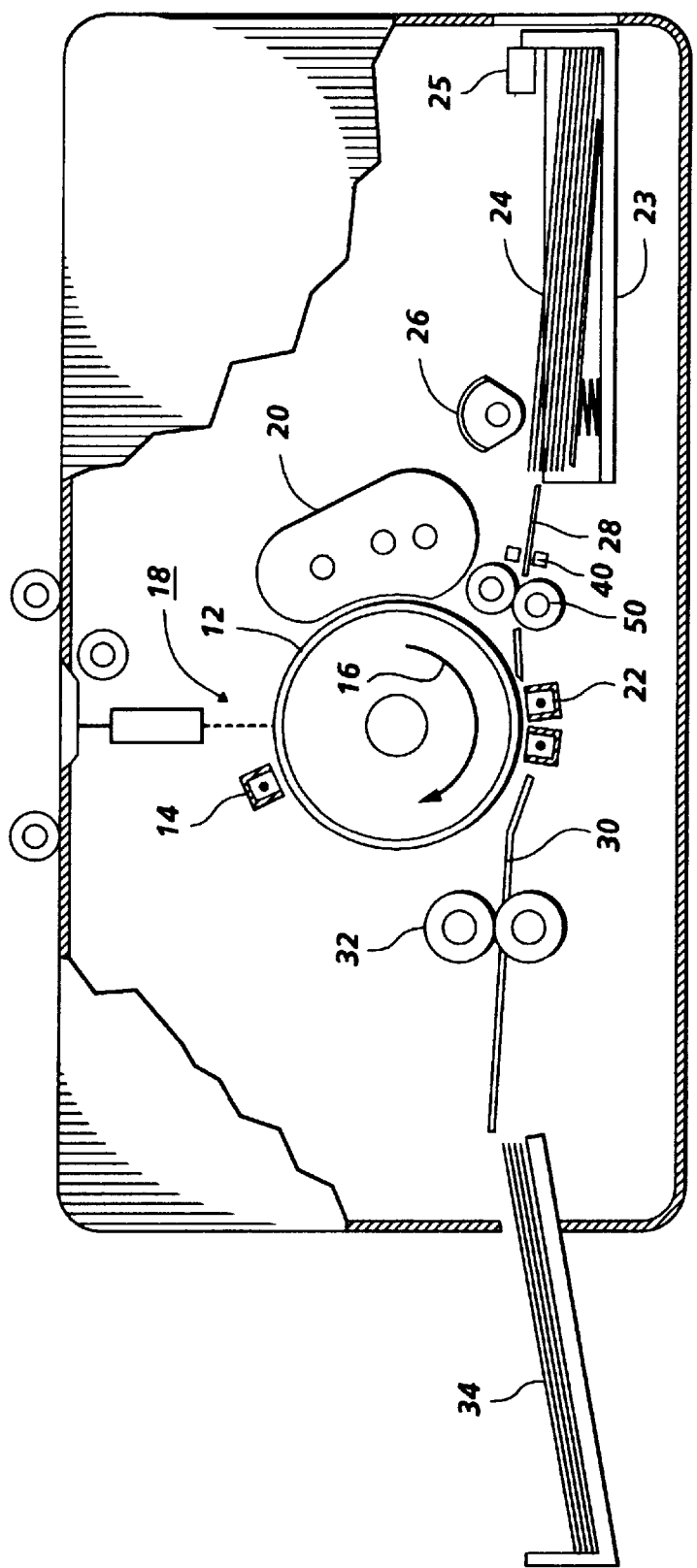
FIG. 1 is an elevational view of a reproduction machine in which the present invention can be utilized.

With reference to FIG. 1, there is illustrated an electrophotographic printing machine having a photoconductive surface 12 movable in the direction of arrow 16 to advance the photoconductive surface sequentially through various processing stations. Substrate roughness detection apparatus 25 is located in supply tray 23. Surface roughness detection apparatus 25 will be described in detail with reference to FIGS. 2 through 5. At a charging station, a corona generating device 14 electrically connected to a high voltage power supply charges the photoconductive surface 12 to a relatively high, substantially uniform potential. Next, the charged portion of the photoconductive surface 12 is advanced through exposure station 18. At exposure station 18, an original document is positioned on a transparent platen. Lamps illuminate the original document and light rays reflected from the original document are transmitted onto photoconductive surface 12. A magnetic brush development system 20 advances a developer material into contact with the electrostatic latent image on surface 12.

At transfer station 22, a sheet of paper or other substrate is moved into contact with the toner powder image. The substrate 24 is advanced to the transfer station by sheet feeding apparatus 26 contacting the uppermost sheet of the stack. Sheet feeding apparatus 26 rotates so as to advance sheets from the stack onto transport 28. The transport 28 directs the advancing substrate through registration rolls 50 and into contact with the photoconductive surface 12 in timed sequence in order that the toner powder image developed thereon contacts the advancing sheet of paper at the transfer station. Transfer station 22 includes a corona generating device for spraying ions onto the underside of the substrate. This attracts the toner image powder from the photoconductor surface 12 to the substrate.

After transfer, the substrate 24 continues to move onto conveyor 30 advancing the substrate to fusing station 32. Fusing station 32 generally includes a heated fuser roller and a backup roller for permanently affixing the transferred powder image to substrate 24. After fusing, substrate 24 is advanced to a catch tray 34 for removal by the operator.

The printer includes a transmissive substrate thickness sensor 40 for determining the thickness of the substrate. Thickness sensor 40 is described in greater detail with reference to FIG. 4.

In a preferred embodiment, surface roughness detection system 25 is located in supply tray 23 so that the roughness of the substrate can be accurately measured while the substrate is in a static state. Furthermore, the thickness sensor 40 is positioned at the sheet feeding apparatus 26 and the roughness detector 25 is positioned with respect to the supply tray 23 in the preferred embodiment so that the respective output signal of each can be processed through a microprocessor and adjustments made to machine parameters before the substrate is processed through the machine. It is understood, however, that other types of substrate thickness sensors and roughness sensors in the art can be found useful to the present invention, as well as at other locations within the machine.

Figure 2:
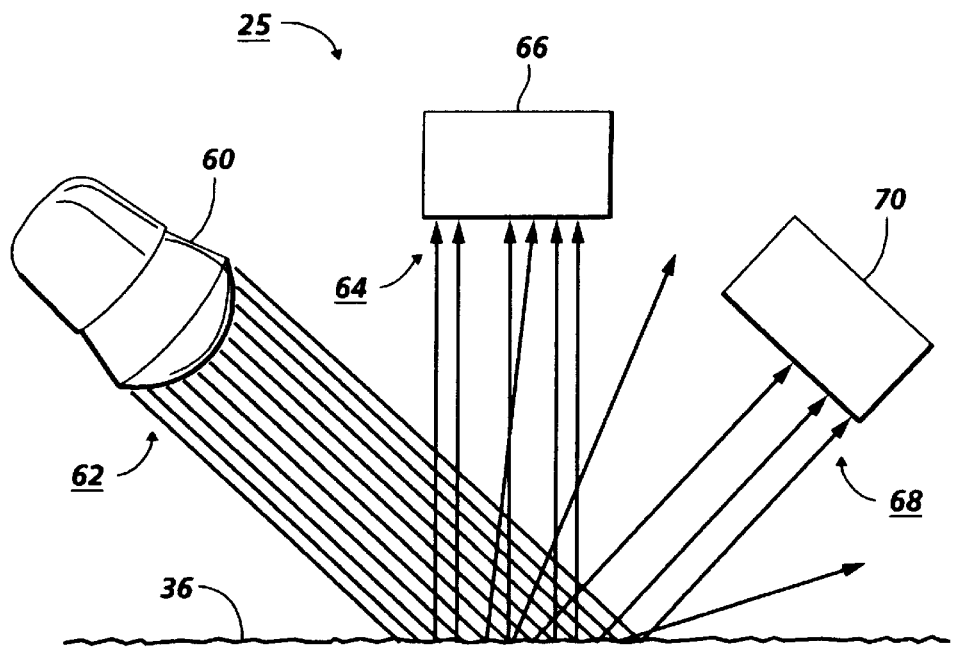
FIG. 2 is a schematic of a light source, sensors and light scattering from a rough surface substrate.

FIG. 2 shows a substrate roughness detection system 25. A rougher surface substrate 36 is shown in FIG. 2 to illustrate the amount of specularly reflected light 68 versus scattered light 64.

The interactions of light beam 62 from a light source 60 such as a light emitting diode (LED), with substrate 36 can be explained as falling within three broad categories. The first of these categories is that portion of light beam 62 that leaves or escapes the system by the mechanisms of absorption or reflection. The second category of light, diffuse or scattered light 64, is shown in FIG. 2. Light beam 62 also results in reflection of diffuse light component 64, which is near to isotropically reflected over all possible angles. Light detector, sensor 66, is positioned to receive a portion of diffuse light 64 for detection, measurement and subsequent processing.

The third category of light, specular light 68, is also shown in FIG. 2. Specular light component 68 is the portion of light beam 62 reflected by substrate that is captured by sensor 70. Specular light is reflected according to the well known mechanisms of Snell's law, which states in part that light impinging upon a surface is reflected at an angle equal to the angle of incidence according to the reflectivity of that surface. For a complex, partially transmissive substrate, specularly reflected light may result from multiple internal reflections within the body of the substrate as well as from simple front surface reflection. Thus, an appropriately placed sensor will detect the specular light component. A suitable sensor for measuring both the specular and diffuse components of reflected light is a phototransistor.

Figure 3:
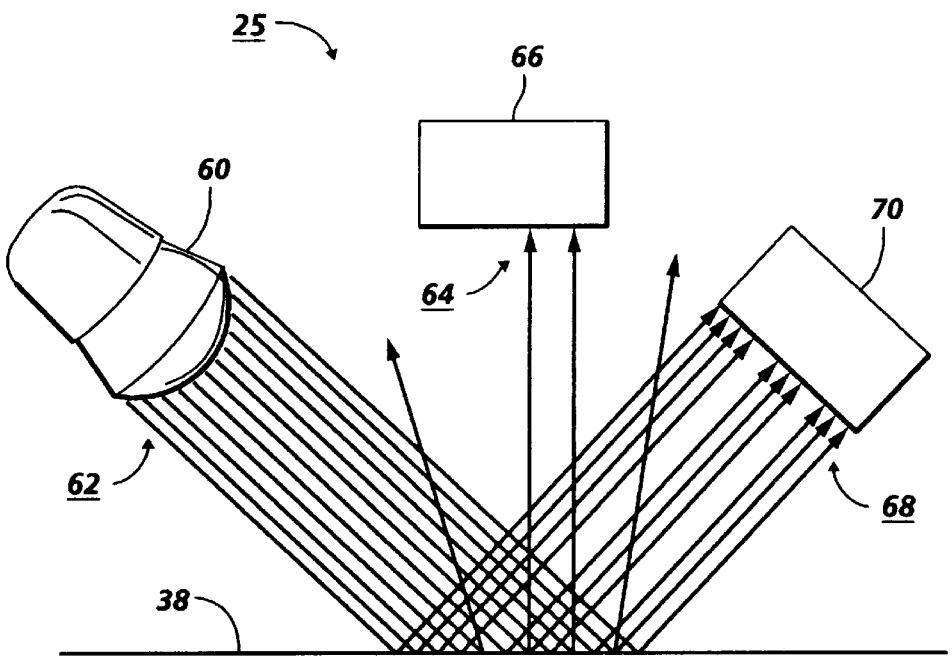
FIG. 3 is a schematic of a light source, sensors and light scattering from a s th surface substrate.

FIG. 3 shows an optical sensor for determining substrate roughness 25 wherein a smoother surface paper 38 is shown to illustrate the increased amount of specularly reflected light 68 versus scattered light 64, as measured by sensors 70 and 66, respectively.

Figure 4:
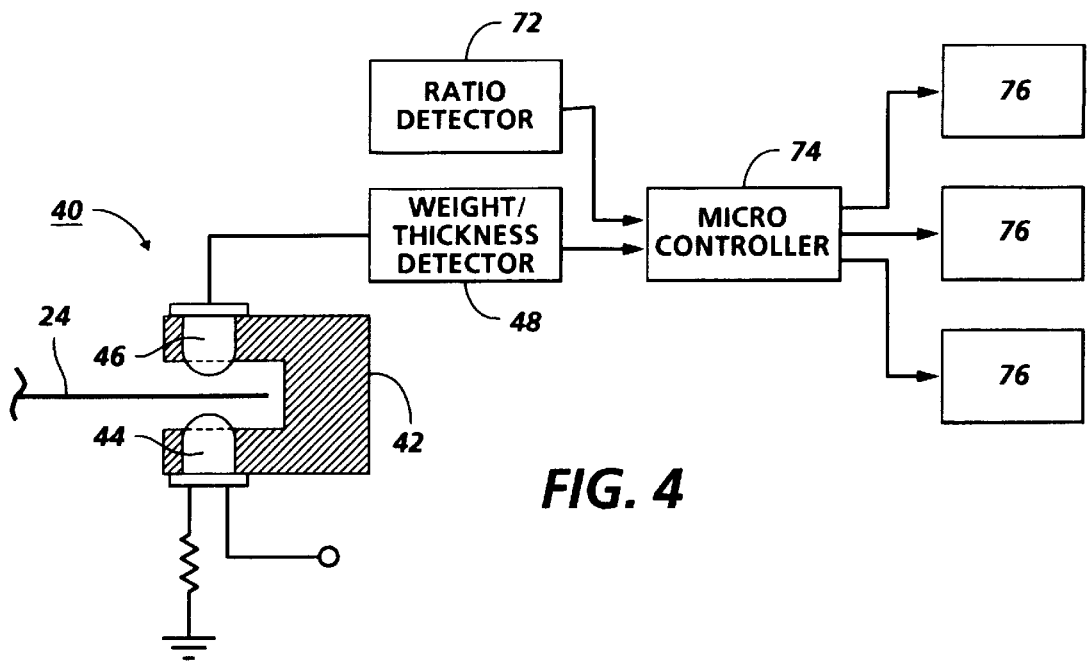
FIG. 4 is a schematic of a substrate thickness detector and an electrical block diagram; an FIG. 5 is an electrical block diagram.

FIG. 4 shows a transmissive substrate thickness sensor 40, including a source for emitting electromagnetic energy or light, such as LED 44, and a phototransistor 46 disposed opposite the LED 44 in a position to receive energy from LED 44. The LED 44 and phototransistor 46 are mounted on opposed legs of the U-shaped detector body 42. The opposed legs of the U-shaped body 42 define between them a detection zone though which an edge of a copy substrate 24 passes as it travels along the feed path. Sensors of this type and associated circuitry are generally of a type known for providing timing and jam detection capabilities. However, when the base bias resistor (not shown) normally associated with such a device and having a relatively small value for making the phototransistor behave like a digital device, is eliminated, the effect is that the phototransistor 46 then behaves in an analog manner, giving a continuous signal that is substantially directly proportional to the amount of energy detected by the phototransistor. The amount of infrared energy transmitted through the substrate is proportional to the basis weight of the substrate, which is directly proportional to the thickness of the substrate, assuming compositional similarity throughout the substrate. The analog output signal of phototransistor 46 is provided to substrate thickness detector 48 for determining the thickness of the substrate 24 positioned in the detection zone of detector 42. The output of the substrate thickness detector 48, together with the output of ratio detector 72 (described with reference to FIG. 5), are then utilized by an operation controller 74, for controlling process operations 76 on the substrate 24.

Figure 5:
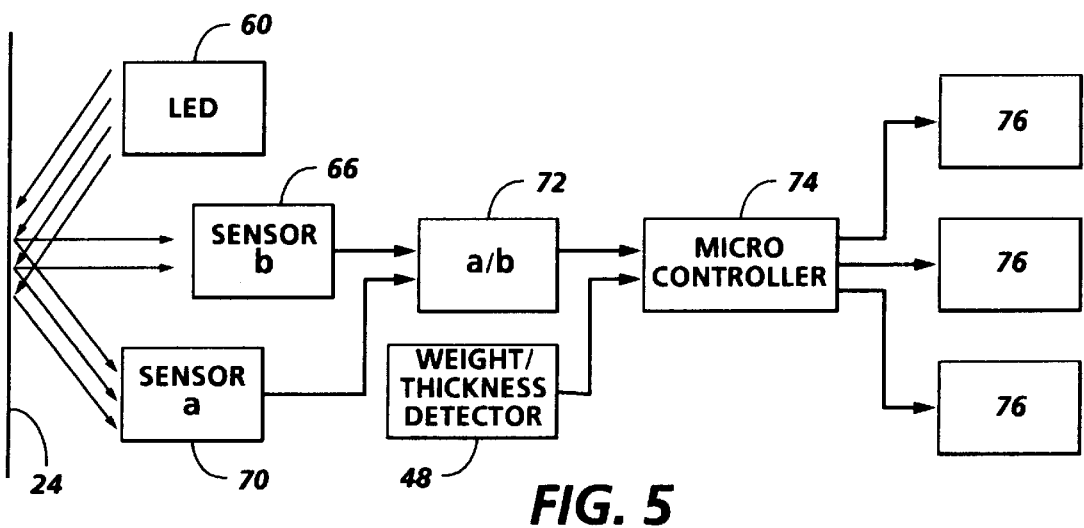

FIG. 5 is an electrical block diagram. Each sensor 66 and 70 produces an output signal indicative of the respective amount of diffuse and specularly reflected light detected by that sensor. The analog output signal provided by each photosensor 66, 70 is provided to ratio determinator 72 for determining the level of roughness of the substrate. Ideally, the ratio determinator 72, substrate thickness detector 48, and operation controller 74 can be implemented in a general purpose microprocessor including a CPU, a ROM and a RAM, which are typically used for controlling machine operations in electrophotographic reproduction machines, facsimile machines, printers and the like. Readings from the output signal of the phototransistor 66 and 70 can be stored in the RAM and a ratio value can be derived in the CPU. A higher ratio value of the specular reflected light to diffuse reflected light indicates a smoother surface substrate since a greater amount of incident light impinging on the substrate is specularly reflected, whereas a lower ratio value indicates a rougher surface substrate due to attenuation of a proportionately greater amount of the incident light.

The output of the ratio determinator 72 and the substrate thickness detector 48 can be utilized by an operation controller 74 for controlling processing operations 76 on the substrate 24 on the basis of the detected roughness and thickness and appropriate model information concerning processing operations to be affected stored in the ROM. For examples, the bias level provided to the corona generating device of the transfer station 22, as well as the set temperature associated with fuser 32, (each shown with reference to FIG. 1), can be controlled on the basis of detected roughness and thickness levels by means of a suitable control algorithm implemented by a microprocessor in the operation controller 74. The design of a suitable controller arrangement and the appropriate programming thereof are influenced by the operation being controlled, and can be determined by one of ordinary skill in this art based upon the provided verbal functional description. Therefore, no further detailed description of hardware or software is necessary in order for one of ordinary skill in the art to practice the present invention without undue experimentation.

The output of the operation controller 74 is provided to the controlled elements 76 to vary the one or more operating parameters being controlled. In this regard, the references to the transfer station 22 and fuser 32 are illustrative only, and it should be realized that other operations in a typical electrophotographic reproduction machine, as well as in other types of machines for marking substrates, can be controlled. For example, development voltage associated with the DMA level, and the voltage associated with the charging station, are some of the machine parameters known to one skilled in the art that can be regulated with respect to the level of substrate roughness and thickness in an electrostatographic printing machine. It will be obvious to one skilled in the art that other machine types for marking onto a substrate that find useful application to the present invention will have corresponding processing operations that can be advantageously adjusted based on the varying levels of roughness and thickness of a particular substrate to be processed through the machine. It will also be obvious to one skilled in the art, that the output of operation controller 74 can be indirectly provided to the controlled processing operations 76 through an intermediate operator control step.

In another embodiment of the invention, the optical sensor used to detect surface roughness can be used for the additional application of detecting image gloss and selectively setting those machine parameters that affect the level of gloss of the image on the output copy sheet. For example, in applications where a sheet or a cover sheet has a logo or label that is consistently marked in the same location of an output copy sheet, an additional optical sensor system, similar to that described with reference to FIGS. 1–5, having the capability of comparing the amount of specularly reflected light to the amount of diffuse reflected light, may be positioned in the output catch tray (indicated by the reference numeral 34 in FIG. 1) to sense the level of gloss of the marked sheet. A glossier image would have a higher level of specularly reflected light and therefore a higher ratio value of specular to diffuse reflected light than would a duller image. A ratio detector would then generate a value indicative of the amount of gloss on the output substrate, similarly to the value generated by the ratio detector of the optical substrate roughness detector hereinbefore described. A signal representative of the gloss ratio value is then input to an operation controller, for controlling processing operations that are affected by the desired level of gloss of the marked substrate. The desired gloss level may be considered by the operation controller as the sole factor, or alternatively, in conjunction with the substrate roughness and/or substrate thickness factors as hereinbefore discussed. The operations to be adjusted can be controlled by means of a suitable control algorithm implemented by a microprocessor in the operation controller 74, and additional user input to the controller based on the desired gloss level.

It is, therefore, evident that there has been provided in accordance with the present invention, a substrate roughness and thickness detection apparatus that fully satisfies the aims and advantages hereinbefore set forth. While this invention has been described in conjunction with a specific embodiment thereof, it is evident that many alternatives, modifications and variations will be apparent to those skilled in the art. For example, it can be appreciated that the present invention may find useful application in a paper or other substrate handling machine having processing operations which do not include marking onto the machine. Accordingly, it is intended to embrace all such alternatives, modifications and variations as fall within the spirit and broad scope of the appended claims.

We claim:

1. A printing machine for marking a substrate, comprising:
   a substrate holder for holding the substrate;
   a catch tray for receiving the substrate;
   a sheet feeding apparatus for transporting the substrate from said substrate holder to said catch tray;
   a processing apparatus, receiving a process control signal, for producing a mark on the substrate in response to the process control signal, said processing apparatus comprising:
   a photoconductive surface;
   a charging station for charging said photoconductive surface;
   an exposure station for illuminating said photoconductive surface to produce an electrostatic latent image;
   a development station for depositing a toner layer on the electrostatic latent image;
   a transfer station for transferring the deposited toner layer from said photoconductive surface onto the substrate as the substrate is moved by said sheet feeding apparatus between said substrate holder and said catch tray;
   a fusing station for fusing the toner layer on the substrate;
   a roughness detector for sensing the substrate roughness and for generating a roughness signal in response thereto;
   a substrate thickness detector for sensing the substrate thickness and for generating a thickness signal in response thereto; and
   a controller, receiving the roughness signal and the thickness signal, for generating a process control signal as a function of the roughness signal and the thickness signal.

2. The printing machine according to claim 1, wherein said roughness detector comprises:
   a light source for projecting light rays on the substrate;
   a first light detector for detecting a level of specularly reflected light from the substrate and generating a first signal in response thereto;
   a second light detector for detecting a level of diffusely reflected light from the substrate and generating a second signal in response thereto, and
   a circuit, receiving the first signal and the second signal, for creating the roughness signal as a function of a ratio of the first signal and the second signal.

3. The printing machine according to claim 2, wherein said light source comprises a light emitting diode.

4. The printing machine according to claim 2, wherein:
   said first light detector comprises a phototransistor; and
   said second light detector comprises a phototransistor.

5. The printing machine according to claim 1, wherein said roughness detector generates the roughness signal while the substrate is in said substrate holder.

6. The printing machine according to claim 1, wherein said substrate thickness detector is positioned such that said controller receives the roughness signal before said processing apparatus receives the control signal.

7. The printing machine according to claim 1, wherein the process control signal controls said development station.

8. The printing machine according to claim 1, wherein the process control signal controls said transfer station.

9. The printing machine according to claim 1, wherein the process control signal controls said fusing station.

10. A method of marking a substrate, comprising:
   (a) moving a substrate from a substrate holder to a catch tray;
   (b) recording a latent image on a photoconductive surface;
   (c) developing the latent image with toner;
   (d) transferring the developed toner from the latent image to the substrate;
   (e) fusing the transferred toner layer on the substrate;
   (f) generating a roughness signal as a function of the substrate roughness;
   (g) generating a thickness signal as a function of the substrate thickness;
   (h) producing a process control signal as a function of the roughness signal and the thickness signal; and
   (j) controlling at least one of the steps of (c), (d), and (e) as a function of the process control signal.

* * * * *